United States Patent
Li et al.

(10) Patent No.: US 11,620,449 B2
(45) Date of Patent: Apr. 4, 2023

(54) METHOD FOR MACHINE READING COMPREHENSION

(71) Applicant: University of Electronic Science and Technology of China, Chengdu (CN)

(72) Inventors: Jianping Li, Chengdu (CN); Xiaofeng Gu, Chengdu (CN); Jian Hu, Chengdu (CN); Ruinan Sun, Chengdu (CN); Wenting Feng, Chengdu (CN); Shunli Li, Chengdu (CN); Sheng Jiang, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 257 days.

(21) Appl. No.: 17/024,726

(22) Filed: Sep. 18, 2020

(65) Prior Publication Data

US 2021/0089718 A1     Mar. 25, 2021

(30) Foreign Application Priority Data

Sep. 19, 2019   (CN) .......................... 201910887852.X

(51) Int. Cl.
    G06F 40/30     (2020.01)
    G06N 20/00     (2019.01)
    (Continued)

(52) U.S. Cl.
    CPC ............ *G06F 40/289* (2020.01); *G06F 17/16* (2013.01); *G06F 40/216* (2020.01); *G06F 40/30* (2020.01); *G06K 9/6257* (2013.01)

(58) Field of Classification Search
    None
    See application file for complete search history.

(56) References Cited

U.S. PATENT DOCUMENTS

| 2016/0358072 | A1* | 12/2016 | Hermann | G06N 3/0427 |
| 2019/0034416 | A1* | 1/2019 | Al Hasan | G06N 3/0454 |
| 2019/0138613 | A1* | 5/2019 | Adada | G06F 40/258 |

FOREIGN PATENT DOCUMENTS

| CN | 108959246 | * | 6/2018 | ........... G06N 3/0454 |
| CN | 110334184 | * | 7/2019 | ......... G06F 16/3329 |

OTHER PUBLICATIONS

Ge, Xuezhi; Research of Machine Reading Comprehension Algorithm Based on Deep Learning; Jun. 24, 2019; University of Electronic Science and Technology of China; Masters Thesis (Year: 2019).*

(Continued)

*Primary Examiner* — Jialong He
(74) *Attorney, Agent, or Firm* — Bayramoglu Law Offices LLC

(57) ABSTRACT

A method for machine reading comprehension includes: S1, obtaining a character-level indication vector of a question and a character-level indication vector of an article; S2, obtaining an encoded question vector and an encoded article vector; S3, obtaining an output P1 of a bidirectional attention model and an output P2 of a shared attention model; S4, obtaining an aggregated vector P3; S5, obtaining a text encoding vector P4; S6, obtaining global interaction information between words within the article; S7, obtaining a text vector P5 after using the self-attention model; S8, obtaining aggregated data P6 according to the text encoding vector P4 and the text vector P5; S9, obtaining a context vector of the article according to the aggregated data P6 and an unencoded article vector P; and S10, predicting an answer position according to the context vector of the article and the encoded question vector to complete the machine reading comprehension.

10 Claims, 1 Drawing Sheet

(51) Int. Cl.
   *G06F 40/289* (2020.01)
   *G06F 40/216* (2020.01)
   *G06F 17/16* (2006.01)
   *G06K 9/62* (2022.01)

(56) References Cited

OTHER PUBLICATIONS

Cui, Yiming, et al. "Consensus attention-based neural networks for Chinese reading comprehension." arXiv preprint arXiv: 1607.02250 (2016). (Year: 2016).*

Song, Linfeng, et al. "Exploring graph-structured passage representation for multi-hop reading comprehension with graph neural networks." arXiv preprint arXiv:1809.02040 (2018). (Year: 2018).*

Xuezhi GE, "Research of Machine Reading Comprehension Algorithm Based on Deep Learning", Jun. 2019.

* cited by examiner

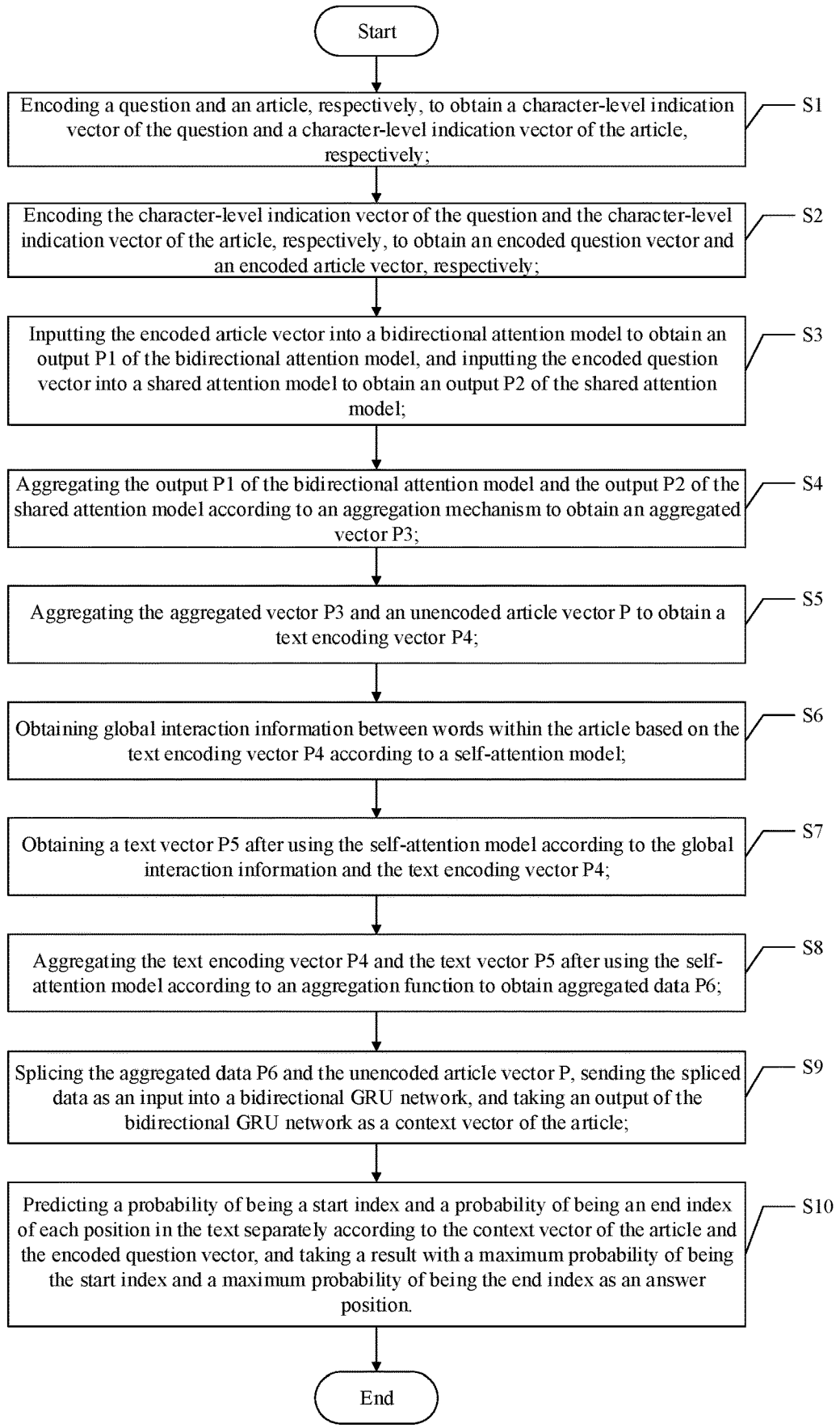

METHOD FOR MACHINE READING COMPREHENSION

CROSS REFERENCE TO THE RELATED APPLICATIONS

This application is based upon and claims priority to Chinese Patent Application No. 201910887852.X, filed on Sep. 19, 2019, the entire contents of which are incorporated herein by reference.

TECHNICAL FIELD

The present invention relates to the technical field of artificial intelligence, and more particularly, to a method for machine reading comprehension.

BACKGROUND

Artificial intelligence (AI) is a new technical science that studies and develops theories, methods, techniques and application systems used for simulating, extending and expanding human intelligence.

Artificial Intelligence is a branch of computer science, and it attempts to know the essence of intelligence and produce a new intelligent machine that can respond in a similar way as human intelligence. Study in this field includes robot, language recognition, image recognition, natural language processing, expert system and others.

Machine reading comprehension is one of the key abilities in the cognitive link, and the development of machine reading comprehension can promote the development of artificial intelligence.

SUMMARY

In order to overcome the above shortcomings in the prior art, the present invention provides a method for machine reading comprehension to rapidly read and comprehend articles and provide answers to questions from the articles.

In order to achieve the above objective, the present invention adopts the following technical solution.

A method for machine reading comprehension includes the following steps:

S1: encoding a question and an article, respectively, to obtain a character-level indication vector of the question and a character-level indication vector of the article, respectively;

S2: encoding the character-level indication vector of the question and the character-level indication vector of the article, respectively, to obtain an encoded question vector and an encoded article vector, respectively;

S3: inputting the encoded article vector into a bidirectional attention model to obtain an output P1 of the bidirectional attention model, and inputting the encoded question vector into a shared attention model to obtain an output P2 of the shared attention model;

S4: aggregating the output P1 of the bidirectional attention model and the output P2 of the shared attention model according to an aggregation mechanism to obtain an aggregated vector P3;

S5: aggregating the aggregated vector P3 and an unencoded article vector P to obtain a text encoding vector P4;

S6: obtaining global interaction information between words within the article based on the text encoding vector P4 according to a self-attention model;

S7: obtaining a text vector P5 after using the self-attention model according to the global interaction information and the text encoding vector P4;

S8: aggregating the text encoding vector P4 and the text vector P5 after using the self-attention model according to an aggregation function to obtain aggregated data P6;

S9: splicing the aggregated data P6 and the unencoded article vector P, sending the spliced data as an input into a bidirectional gated recurrent unit (GRU) network, and taking an output of the bidirectional GRU network as a context vector of the article; and S10: predicting a probability of being a start index and a probability of being an end index of each position in the article separately according to the context vector of the article and the encoded question vector, and taking a result with a maximum probability of being the start index and a maximum probability of being the end index as an answer position to complete the machine reading comprehension.

Further, a specific method of step S1 includes the following sub-steps:

S1-1: indicating each word m in the question and the article as a character sequence $(c_1, \ldots, c_{|m|})$, and indicating each word in a word list as a vector of $d_c$ dimension;

S1-2: applying a convolution kernel with a size of $w \in \mathbb{R}^{d_c \times w}$ to each word sequence, and adopting the following formula to obtain a feature vector $f_i$:

$$f_i = \tan h(w^T c_{i:i+w-1} + b)$$

where, tan h(•) is a hyperbolic tangent function; $c_{i:i+w-1}$ is a character sequence segment; b is a deviation parameter; $(\cdot)^T$ is a transpose of a matrix; and $\mathbb{R}$ is a number field; and S1-3: performing a maximum pooling operation on all feature vectors to obtain the character-level indication vector of the question and the character-level indication vector of the article, respectively.

Further, a specific method of step S2 includes the following sub-steps:

S2-1: obtaining the encoded question vector $Q_R$ according to the following formulas:

$$S_{i:} = W_s^T [P; Q; P \circ Q],$$

$$Q' = \text{softmax}(S_{i:}) \cdot Q,$$

$$S = \text{softmax}(Q'^T W_1 Q'),$$

$$Q'' = S \cdot Q',$$

$$Q_{agg} = \tanh(W_f [Q; Q''; Q'' - Q; Q'' \circ Q] + b_f),$$

$$b_j = \frac{\exp(w \cdot Q_{agg})}{\sum_{j'} \exp(w Q_{agg_{j'}})},$$

$$Q_R = b_j Q_{agg},$$

where, P is the character-level indication vector of the article; Q is the character-level indication vector of the question; [;] indicates performing a splicing operation on vectors according to rows; $P \circ Q$ indicates performing a dot product operation on P and Q; $W_s$ is a learning parameter; $(\cdot)^T$ is a transpose of a matrix; $S_{i:}$, Q', S, Q", $Q_{agg}$ and $b_j$ are all intermediate parameters; soft max(•) is a softmax function; tan h(•) is a hyperbolic tangent function; $b_f$ is a learning parameter; $W_1$ is a weight; $W_f$ is a learning parameter; exp(•) is an exponential function with a natural constant e as a base; $Q_{agg_j}$ indicates an intermediate parameter corresponding to a single vector element; and indicates a $j^{th}$ vector element;

S2-2: obtaining an input vector $h_t^P$ of an article P according to the following formulas:

$$u_i^P = [fastText(w_i^P)],$$

$$u_i^Q = [fastText(w_i^Q)],$$

$$S'_{ij} = ReLU(Uu_i^P) \cdot D \cdot ReLU(Uu_j^Q),$$

$$\alpha_{ij} \propto \exp(S'_{ij}),$$

$$u_i'^P = \sum_i \alpha_{ij} u_j^Q,$$

$$h_t^P = [Glove(w_t^P); c_t^P; BERT(w_t^P); u_t'^P],$$

where, $w_i^P$ is an article sequence of the article P; fastText(•) indicates a word vector obtained from fastText $u_i^P$, $u_i^Q$, $S_{ij}'$, $\alpha_{ij}$, and $u_i'^P$ are all intermediate parameters; $w_i^Q$ is a character vector of a question Q; exp(•) is an exponential function with a natural constant e as a base; $u_j^Q$ is a character vector of the question Q; ReLU(•) is an activation function; U and D are weights; [;] indicates performing the splicing operation on the vectors according to the rows; $w_t^P$ is an article sequence of the article P; $c_i^P$ is a character vector of the article P; Glove(•) indicates a word vector obtained from Glove; and BERT(•) indicates a feature vector outputting a hidden layer of a transformer network; and S2-3: taking the input vector $h_t^P$ as an input of a bidirectional recurrent neural network to obtain the encoded article vector.

Further, a specific method of step S4 is as follows:

aggregating the output P1 of the bidirectional attention model and the output P2 of the shared attention model by using the aggregation mechanism according to the following formula to obtain the aggregated vector P3:

$$P3 = \tan h(W_f[P1;P2;P1-P2;P1 \circ P2]+b_f),$$

where, tan h(•) is a hyperbolic tangent function; $W_f$ and $b_f$ are both learning parameters; [;] indicates performing a splicing operation on vectors according to rows; and P1∘P2 indicates performing a dot product operation on P1 and P2.

Further, a specific method of step S5 is as follows:

aggregating the aggregated vector P3 and the unencoded article vector P according to the following formula to obtain the text encoding vector P4:

$$P4 = \tan h(W_f[P;P3;P-P3;P \circ P3]+b_f),$$

where, tan h(•) is a hyperbolic tangent function; $W_f$ and $b_f$ are both learning parameters; [;] indicates performing a splicing operation on vectors according to rows; and P∘P3 indicates performing a dot product operation on P and P3.

Further, a specific method of step S6 is as follows:

obtaining the global interaction information $S_{ij}$ between the words within the article based on the text encoding vector P4 according to the self-attention model and the following formula:

$$S_{ij} = \text{soft max}(P4 \cdot W_1 \cdot (P4)^T),$$

where, soft max(•) is a normalized exponential function; $W_1$ is a weight; and $(•)^T$ is a transpose of a matrix.

Further, a specific method of step S7 is as follows:

obtaining the text vector P5 after using the self-attention model according to the following formula:

$$P5 = S_{ij}P4,$$

where, $S_{ij}$ is the global interaction information.

Further, a specific method of step S8 is as follows:

aggregating the text encoding vector P4 and the text vector P5 after using the self-attention model according to the following formula to obtain the aggregated data P6:

$$P6 = \tan h(W_f[P4;P5;P5-P4;P5 \circ P4]+b_f),$$

where, tan h(•) is a hyperbolic tangent function; $W_f$ and $b_f$ are both learning parameters; [;] indicates performing a splicing operation on vectors according to rows; and P5∘P4 indicates performing a dot product operation on P5 and P4.

Further, a specific method of step S9 is as follows:

splicing the aggregated data P6 and the unencoded article vector P according to the following formula, sending the spliced data as an input into the bidirectional GRU network, and taking the output R of the bidirectional GRU network as the context vector of the article:

$$R = BiGRU([P;P6]),$$

where, BiGRU(•) is the bidirectional GRU network; and [;] indicates performing a splicing operation on vectors according to rows.

Further, a specific method of step S10 is as follows:

predicting a probability $P_{start}(i)$ of being a start position and a probability $P_{end}(i)$ of being an end position of each word in the article separately by two separate classifiers according to the following formulas, and taking a result with the maximum probability of being the start index and the maximum probability of being the end index as an answer position to complete the machine reading comprehension:

$$P_{start}(i) = \text{soft max}(O^Q \cdot W_s^T \cdot O_i^P),$$

$$P_{end}(i) = \text{soft max}(O^Q \cdot W_e^T \cdot O_i^P),$$

where, $O^Q$ is the question vector; $O_i^P$ is the context vector of the article; $W_s$ and $W_e$ are both classifier parameters; $(•)^T$ is a transpose of a matrix; soft max(•) is a softmax function; a loss function of the classifiers is $$L(\theta) = -\frac{1}{N}\sum_i^N \log p_s(y_i^s) + \log p_e(y_i^e);$$

$\theta$ is a training parameter set; $p_s$ is a value of the probability of being the start position, and $p_e$ is a value of the probability of being the end position; $y_i^s$ is a real start position index, and $y_i^e$ is a real end position index; a training goal of the classifiers is to minimize a negative likelihood function and a cost of the loss function; log(•) is a log function; and N is a total number of elements of the context vector of the article.

The present invention has the following advantages. The present invention first calculates a similarity matrix between the question and the article to obtain context features with the influence of the question, fuses results of two attention models, and then calculates an attention function between the words within the article using the self-attention model to obtain a difference between different words. In the whole process, the aggregation mechanism is used throughout to fuse feature vectors from a low level to a high level, thereby extracting feature information of different levels and finally obtaining a semantic vector for predicting the answer. In the present invention, reading an article at the first time when answering the reading comprehension question corresponds to transforming symbols into vectors, then establishing a relation between the article and the question through the attention model is equivalent to the process of reading the article in the human brain with the question, and finally performing self-knowing comprehension using the self-attention model is equivalent to reading the article intensively and locating the answer.

BRIEF DESCRIPTION OF THE DRAWING

FIGURE is a flow chart of the present invention.

DETAILED DESCRIPTION OF THE EMBODIMENTS

Embodiments of the present invention are described in detail below, to facilitate those skilled in the art to understand the present invention. However, it should be clear that the present invention is not limited to the scope of the embodiments. For those having ordinary skill in the art, as long as various changes fall within the spirit and scope of the present invention defined and determined by the claims, these changes are obvious, and any invention using the concept of the present invention shall fall within the scope of protection of the present invention.

As shown in FIGURE, a method for machine reading comprehension includes the following steps.

S1. A question and an article are encoded, respectively, to obtain a character-level indication vector of the question and a character-level indication vector of the article, respectively.

S2. The character-level indication vector of the question and the character-level indication vector of the article are encoded, respectively, to obtain an encoded question vector and an encoded article vector, respectively.

S3. The encoded article vector is input into a bidirectional attention model to obtain an output P1 of the bidirectional attention model, and the encoded question vector is input into a shared attention model to obtain an output P2 of the shared attention model.

S4. The output P1 of the bidirectional attention model and the output P2 of the shared attention model are aggregated according to an aggregation mechanism to obtain an aggregated vector P3.

S5. The aggregated vector P3 and an unencoded article vector P are aggregated to obtain a text encoding vector P4.

S6. Global interaction information between words within the article is obtained based on the text encoding vector P4 according to a self-attention model.

S7. A text vector P5 after using the self-attention model is obtained according to the global interaction information and the text encoding vector P4.

S8. The text encoding vector P4 and the text vector P5 after using the self-attention model are aggregated according to an aggregation function to obtain aggregated data P6.

S9. The aggregated data P6 and the unencoded article vector P are spliced, the spliced data as an input are sent into a GRU network, and an output of the bidirectional GRU network is taken as a context vector of the article.

S10. A probability of being a start index and a probability of being an end index of each position in the article are predicted separately according to the context vector of the article and the encoded question vector, and a result with a maximum probability of being the start index and a maximum probability of being the end index is taken as an answer position to complete the machine reading comprehension.

A specific method of step S1 includes the following sub-steps.

S1-1. Each word m in the question and the article is indicated as a character sequence $(c_1, \ldots, c_{|m|})$, and each word in a word list is indicated as a vector of d dimension.

S1-2. A convolution kernel with a size $w \in \mathbb{R}^{d_c \times w}$ of is applied to each word sequence, and the following formula is adopted to obtain a feature vector $f_i$:

$$f_i = \tan h(w^T c_{i:i+w-1} + b)$$

where, tan h(•) is a hyperbolic tangent function; is a character sequence segment; b is a deviation parameter; $(\cdot)^T$ is a transpose of a matrix; and $\mathbb{R}$ is a number field.

S1-3. A maximum pooling operation is performed on all feature vectors to obtain the character-level indication vector of the question and the character-level indication vector of the article, respectively.

A specific method of step S2 includes the following sub-steps.

S2-1. The encoded question vector $Q_R$ is obtained according to the following formulas:

$$S_{i:} = W_s^T [P; Q; P \circ Q],$$

$$Q' = \text{softmax}(S_{i:}) \cdot Q,$$

$$S = \text{softmax}(Q'^T W_1 Q'),$$

$$Q'' = S \cdot Q',$$

$$Q_{agg} = \tanh(W_f [Q; Q''; Q'' - Q; Q'' \circ Q] + b_f),$$

$$b_j = \frac{\exp(w \cdot Q_{agg})}{\sum_{j'} \exp(w Q_{agg_{j'}})},$$

$$Q_R = b_j Q_{agg},$$

where, P is the character-level indication vector of the article; Q is the character-level indication vector of the question; [;] indicates performing a splicing operation on vectors according to rows; $P \circ Q$ indicates performing a dot product operation on P and Q; $W_s$ is a learning parameter; $(\cdot)^T$ is a transpose of a matrix; $S_{i:}$, $Q'$, S, $Q''$, $Q_{agg}$ and $b_j$ are all intermediate parameters; soft max(•) is a softmax function; tan h(•) is a hyperbolic tangent function; $b_f$ is a learning parameter; $W_1$ is a weight; $W_f$ is a learning parameter; exp(•) is an exponential function with a natural constant e as a base; $Q_{agg_j}$ indicates an intermediate parameter corresponding to a single vector element; and j' indicates a $j'^{th}$ vector element.

S2-2. An input vector $h_t^P$ of an article P is obtained according to the following formulas:

$$u_i^P = [fastText(w_i^P)],$$

$$u_i^Q = [fastText(w_i^Q)],$$

$$S'_{ij} = ReLU(Uu_i^P) \cdot D \cdot ReLU(Uu_j^Q),$$

$$\alpha_{ij} \propto \exp(S'_{ij}),$$

$$u_i'^P = \sum_i \alpha_{ij} u_j^Q,$$

$$h_t^P = [Glove(w_t^P); c_t^P; BERT(w_t^P); u_t'^P],$$

where, $w_i^P$ is an article sequence of the article P; fastText (•) indicates a word vector obtained from fastText; $u_i^P$, $u_i^Q$, $S_{ij}'$, $\alpha_{ij}$, and $u_i'^P$ are all intermediate parameters; $w_i^Q$ is a character vector of a question Q; exp(•) is an exponential function with a natural constant e as a base; $u_j^Q$ is a character vector of the question Q; ReLU(•) is an activation function; U and D are weights; [;] indicates performing the splicing operation on the vectors according to the rows; $w_t^P$ is an article sequence of the article P; $c_t^P$ is a character vector of the article P; Glove(•) indicates a word vector obtained from Glove; and BERT(•) indicates a feature vector that outputs a hidden layer of a transformer network.

S2-3. The input vector $h_t^P$ is taken as an input of a bidirectional recurrent neural network to obtain the encoded article vector.

A specific method of step S4 is as follows.

The output P1 of the bidirectional attention model and the output P2 of the shared attention model are aggregated by using the aggregation mechanism according to the following formula to obtain the aggregated vector P3:

$$P3=\tan h(W_f[P1;P2;P1-P2;P1 \circ P2]+b_f),$$

where, tan h(•) is a hyperbolic tangent function; $W_f$ and $b_f$ are both learning parameters; [;] indicates performing a splicing operation on vectors according to rows; and P1∘P2 indicates performing a dot product operation on P1 and P2.

A specific method of step S5 is as follows.

The aggregated vector P3 and the unencoded article vector P are aggregated according to the following formula to obtain the text encoding vector P4:

$$P4=\tan h(W_f[P;P3;P-P3;P \circ P3]+b_f),$$

where, tan h(•) is a hyperbolic tangent function; $W_f$ and $b_f$ are both learning parameters; [;] indicates performing a splicing operation on vectors according to rows; and P∘P3 indicates performing a dot product operation on P and P3.

A specific method of step S6 is as follows.

The global interaction information $S_{ij}$ between the words within the article is obtained based on the text encoding vector P4 according to the self-attention model and the following formula:

$$S_{ij}=\text{soft max}(P4 \cdot W_1 \cdot (P4)^T),$$

where, soft max(•) is a normalized exponential function; $W_1$ is a weight; and $(\bullet)^T$ is a transpose of a matrix.

A specific method of step S7 is as follows.

The text vector P5 after using the self-attention model is obtained according to the following formula:

$$P5=S_{ij}P4,$$

where, $S_{ij}$ is the global interaction information.

A specific method of step S8 is as follows.

The text encoding vector P4 and the text vector P5 after using the self-attention model are aggregated according to the following formula to obtain the aggregated data P6:

$$P6=\tan h(W_f[P4;P5;P5-P4;P5 \circ P4]+b_f),$$

where, tan h(•) is a hyperbolic tangent function; $W_f$ and $b_f$ are both learning parameters; [;] indicates performing a splicing operation on vectors according to rows; and P5∘P4 indicates performing a dot product operation on P5 and P4.

A specific method of step S9 is as follows.

The aggregated data P6 and the unencoded article vector P are spliced according to the following formula, the spliced data as an input are sent into the bidirectional GRU network, and the output R of the bidirectional GRU network is taken as the context vector of the article:

$$R=\text{BiGRU}([P;P6]),$$

where, BiGRU(•) is the bidirectional GRU network; and [;] indicates performing a splicing operation on vectors according to rows.

A specific method of step S10 is as follows.

A probability $P_{start}(i)$ of being a start position and a probability $P_{end}(i)$ of being an end position of each word in the article are predicted separately by two separate classifiers according to the following formulas, and a result with the maximum probability of being the start index and the maximum probability of being the end index is taken as an answer position to complete the machine reading comprehension:

$$P_{start}(i)=\text{soft max}(O^Q \cdot W_s^T \cdot O_i^P),$$

$$P_{end}(i)=\text{soft max}(O^Q \cdot W_e^T \cdot O_i^P),$$

where, $O^Q$ is the question vector; $O_i^P$ is the context vector of the article; $W_s$ and $W_e$ are both classifier parameters; $(\bullet)^T$ is a transpose of a matrix; soft max(•) is a softmax function; a loss function of the classifiers is $$L(\theta) = -\frac{1}{N}\sum_i^N \log p_s(y_i^s) + \log p_e(y_i^e);$$

θ is a training parameter set; $p_s$ is a value of the probability of being the start position, and $p_e$ is a value of the probability of being the end position; $y_i^s$ is a real start position index, and $y_i^e$ is a real end position index; a training goal of the classifiers is to minimize a negative likelihood function and a cost of the loss function; log(•) is a log function; and N is a total number of elements of the context vector of the article.

In summary, the present invention first calculates a similarity matrix between the question and the article to obtain context features with the influence of the question, fuses results of two attention models, and then calculates an attention function between the words within the article using the self-attention model to obtain a difference between different words. In the whole process, the aggregation mechanism is used throughout to fuse feature vectors from a low level to a high level, thereby extracting feature information of different levels and finally obtaining a semantic vector for predicting the answer. In the present invention, reading an article at the first time when answering the reading comprehension question corresponds to transforming symbols into vectors, then establishing a relation between the article and the question through the attention model is equivalent to the process of reading the article in the human brain with the question, and finally performing self-knowing comprehension using the self-attention model is equivalent to reading the article intensively and locating the answer.

What is claimed is:

1. A method for machine reading comprehension, comprising the following steps:
   S0: obtaining a question in words from a user and obtaining an article in words containing an answer to the question;
   S1: encoding the question words and the article words, respectively, to obtain a character-level indication vector of the question and a character-level indication vector of the article, respectively;
   S2: encoding the character-level indication vector of the question and the character-level indication vector of the article, respectively, to obtain an encoded question vector and an encoded article vector, respectively;
   S3: inputting the encoded article vector into a bidirectional attention model to obtain an output P1 of the bidirectional attention model, and inputting the encoded question vector into a shared attention model to obtain an output P2 of the shared attention model;

S4: aggregating the output P1 of the bidirectional attention model and the output P2 of the shared attention model according to an aggregation mechanism to obtain an aggregated vector P3;

S5: aggregating the aggregated vector P3 and an unencoded article vector P to obtain a text encoding vector P4;

S6: obtaining global interaction information between words within the article based on the text encoding vector P4 according to a self-attention model;

S7: obtaining a text vector P5 after using the self-attention model according to the global interaction information and the text encoding vector P4;

S8: aggregating the text encoding vector P4 and the text vector P5 after using the self-attention model according to an aggregation function to obtain aggregated data P6;

S9: splicing the aggregated data P6 and the unencoded article vector P to obtain spliced data, sending the spliced data as an input into a bidirectional gated recurrent unit (GRU) network, and taking an output of the bidirectional GRU network as a context vector of the article;

S10: predicting a probability of being a start index and a probability of being an end index of each position in the article separately according to the context vector of the article and the encoded question vector, and taking a result with a maximum probability of being the start index and a maximum probability of being the end index as an answer position in the article to complete the machine reading comprehension; and S11: providing word or words located at the answer position in the article to the user as the answer to the question.

2. The method according to claim 1, wherein a specific method of step S1 comprises the following sub-steps:

S1-1: indicating each word m in the question and the article as a character sequence $(c_1, \ldots, c_{|m|})$, and indicating each word in a word list as a vector of $d_c$ dimension;

S1-2: applying a convolution kernel with a size of $w \in \mathbb{R}^{d_c \times w}$ to each word sequence, and adopting the following formula to obtain a feature vector $f_i$:

$$f_i = \tan h(w^T c_{i:i+w-1} + b)$$

where, tan h(•) is a hyperbolic tangent function; $c_{i:i+w-1}$ is a character sequence segment; b is a deviation parameter; $(\bullet)^T$ is a transpose of a matrix; and $\mathbb{R}$ is a number field; and S1-3: performing a maximum pooling operation on all feature vectors to obtain the character-level indication vector of the question and the character-level indication vector of the article, respectively.

3. The method according to claim 1, wherein a specific method of step S2 comprises the following sub-steps:

S2-1: obtaining the encoded question vector $Q_R$ according to the following formulas:

$$S_{i:} = W_s^T[P;Q;P \circ Q],$$

$$Q' = \text{softmax}(S_{i:}) \cdot Q,$$

$$S = \text{softmax}(Q'^T W_1 Q'),$$

$$Q'' = S \cdot Q',$$

$$Q_{agg} = \tanh(W_f[Q;Q'';Q'' - Q;Q'' \circ Q] + b_f),$$

$$b_j = \frac{\exp(w \cdot Q_{agg})}{\sum_{j'} \exp(w Q_{agg_{j'}})},$$

$$Q_R = b_j Q_{agg},$$

where, P is the character-level indication vector of the article; Q is the character-level indication vector of the question; [;] indicates performing a splicing operation on vectors according to rows; $P \circ Q$ indicates performing a dot product operation on P and Q; $W_s$, $W_f$, and $b_f$ are learning parameters; $(\bullet)^T$ is a transpose of a matrix; $S_{i:}, Q', S, Q'', Q_{agg}$ and $b_j$ are intermediate parameters; soft max(•) is a softmax function; tan h(•) is a hyperbolic tangent function; $W_1$ is a weight; exp(•) is an exponential function with a natural constant e as a base; $Q_{agg\_j'}$ indicates an intermediate parameter corresponding to a single vector element; and j' indicates a $j'^{th}$ vector element;

S2-2: obtaining an input vector $h_t^P$ of the article P according to the following formulas:

$$u_i^P = [fastText(w_i^P)],$$

$$u_i^Q = [fastText(w_i^Q)],$$

$$S_{ij}' = ReLU(Uu_i^P) \cdot D \cdot ReLU(Uu_j^Q),$$

$$\alpha_{ij} \propto \exp(S_{ij}'),$$

$$u_i'^P = \sum_i \alpha_{ij} u_j^Q,$$

$$h_t^P = [\text{Glove}(w_t^P); c_t^P; BERT(w_t^P); u_t'^P],$$

where, $w_i^P$ and $w_t^P$ and $w_r^P$ are article sequences of the article P; fastText(•) indicates a word vector obtained from fastText; $u_i^P, u_i^Q, S_{ij}', \alpha_{ij}$, and $u_i'^P$ are intermediate parameters; $w_i^Q$ is a character vector of the question Q; exp(•) is an exponential function with a natural constant e as a base; $u_j^Q$ is a character vector of the question Q; ReLU(•) is an activation function; U and D are weights; [;] indicates performing the splicing operation on the vectors according to the rows; $c_t^P$ is a character vector of the article P; Glove(•) indicates a word vector obtained from Glove; and BERT(•) indicates a feature vector outputting a hidden layer of a transformer network; and S2-3: taking the input vector $h_t^P$ as an input of a bidirectional recurrent neural network to obtain the encoded article vector.

4. The method according to claim 1, wherein a specific method of step S4 is as follows:

aggregating the output P1 of the bidirectional attention model and the output P2 of the shared attention model by using the aggregation mechanism according to the following formula to obtain the aggregated vector P3:

$$P3 = \tan h(W_f[P1;P2;P1-P2;P1 \circ P2] + b_f)$$

where, tan h(•) is a hyperbolic tangent function; $W_f$ and $b_f$ are learning parameters; [;] indicates performing a splicing operation on vectors according to rows; and P1 ○P2 indicates performing a dot product operation on P1 and P2.

5. The method according to claim 1, wherein a specific method of step S5 is as follows:

aggregating the aggregated vector P3 and the unencoded article vector P according to the following formula to obtain the text encoding vector P4:

$$P4=\tan h(W_f[P;P3;P-P3;P\circ P3]+b_f),$$

where, tan h(•) is a hyperbolic tangent function; $W_f$ and $b_f$ are learning parameters; [;] indicates performing a splicing operation on vectors according to rows; and P ○P3 indicates performing a dot product operation on P and P3.

6. The method according to claim 1, wherein a specific method of step S6 is as follows:

obtaining the global interaction information $S_{ij}$, between the words within the article based on the text encoding vector P4 according to the self-attention model and the following formula:

$$S_{ij}=\text{soft max}(P4 \cdot W_1 \cdot (P4)^T),$$

where, soft max(•) is a normalized exponential function; $W_1$ is a weight; and $(•)^T$ is a transpose of a matrix.

7. The method according to claim 1, wherein a specific method of step S7 is as follows:

obtaining the text vector P5 after using the self-attention model according to the following formula:

$$P5=S_{ij}P4$$

where, $S_{ij}$ is the global interaction information.

8. The method according to claim 1, wherein a specific method of step S8 is as follows:

aggregating the text encoding vector P4 and the text vector P5 after using the self-attention model according to the following formula to obtain the aggregated data P6:

$$P6=\tan h(W_f[P4;P5;P5-P4;P5\circ P4]+b_f)$$

where, tan h(•) is a hyperbolic tangent function; $W_f$ and $b_f$ are learning parameters;

[;] indicates performing a splicing operation on vectors according to rows; and P5 ○P4 indicates performing a dot product operation on P5 and P4.

9. The method according to claim 1, wherein a specific method of step S9 is as follows:

splicing the aggregated data P6 and the unencoded article vector P according to the following formula, sending the spliced data as an input into the bidirectional GRU network, and taking the output R of the bidirectional GRU network as the context vector of the article:

$$R=\text{BiGRU}([P;P6])$$

where, BiGRU(•) is the bidirectional GRU network; and [;] indicates performing a splicing operation on vectors according to rows.

10. The method according to claim 1, wherein a specific method of step S10 is as follows:

predicting a probability $P_{start}$ (i) of being a start position and a probability $P_{end}$ (i) of being an end position of each word in the article separately by two separate classifiers according to the following formulas, and taking a result with the maximum probability of being the start index and the maximum probability of being the end index as an answer position to complete the machine reading comprehension:

$$P_{start}(i)=\text{soft max}(O^Q \cdot W_s^T O_i^P),$$

$$P_{end}(i)=\text{soft max}(O^Q \cdot W_e^T O_i^P),$$

where, $O^Q$ is the question vector; $O_i^P$ is the context vector of the article; $W_s$ and $W_e$ are classifier parameters; $(•)^T$ is a transpose of a matrix; soft max(•) is a softmax function; a loss function of the two separate classifiers is $$L(\theta) = -\frac{1}{N}\sum_i^N \log\ p_s(y_i^s) + \log\ p_e(y_i^e);$$

$\theta$ is a training parameter set; $p_s$ is a value of the probability of being the start position, and $P_e$ is a value of the probability of being the end position; $y_i^s$ is a real start position index, and $y_i^e$ is a real end position index; a training goal of the two separate classifiers is to minimize a negative likelihood function and a cost of the loss function; log(•) is a log function; and N is a total number of elements of the context vector of the article.

* * * * *